(No Model.)

G. N. ADAMS.
VEHICLE WHEEL LOCK.

No. 365,559. Patented June 28, 1887.

WITNESSES:

INVENTOR:
G. N. Adams
BY Munn & Co.
ATTORNEYS.

UNITED STATES PATENT OFFICE.

GEORGE N. ADAMS, OF OLEAN, NEW YORK.

VEHICLE-WHEEL LOCK.

SPECIFICATION forming part of Letters Patent No. 365,559, dated June 28, 1887.

Application filed October 20, 1886. Serial No. 216,731. (No model.)

*To all whom it may concern:*

Be it known that I, GEORGE N. ADAMS, of Olean, in the county of Cattaraugus and State of New York, have invented a new and useful Improvement in Vehicle-Wheel Locks, of which the following is a full, clear, and exact description.

This invention relates to locks for carriage or other vehicle wheels in which a bolt or catch is combined with the axle of the vehicle, and is made to engage, when the lock is required to be established, with a plate on the inner face of the hub of the wheel that, when free, turns loosely on the axle; and the invention consists in a vehicle-wheel-locking device of this description, of novel construction, substantially as hereinafter described, and pointed out in the claims.

The invention is more particularly designed as a lock for the wheels of children's carriages or perambulators, and will here be described accordingly; but by suitably modifying the parts it may also be used upon vehicles or wagons of a larger size.

Reference is to be had to the accompanying drawings, forming a part of this specification, in which similar letters of reference indicate corresponding parts in all the figures.

Figure 1:
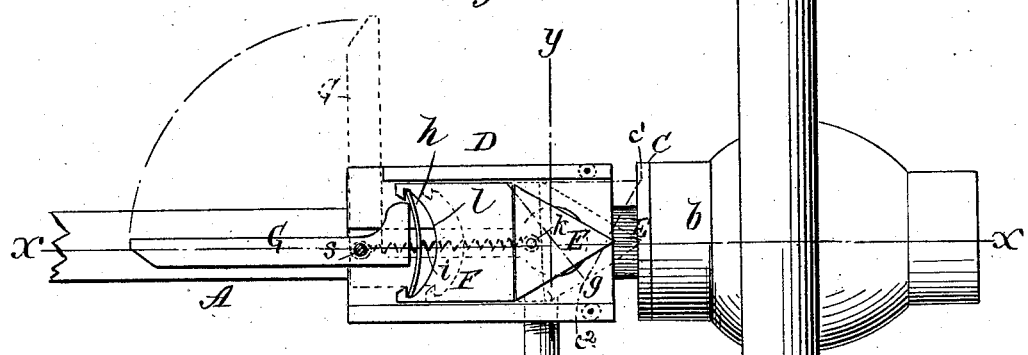
Figure 2:
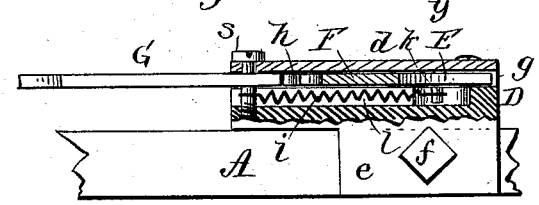
Figure 3:
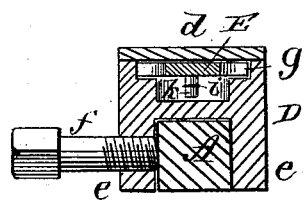

Figure 1 represents an exterior longitudinal view of a child's-carriage axle in part with wheel in part thereon, and having my improved lock applied, the cover of the lock-case being removed. Fig. 2 is a longitudinal section of the same in part, mainly upon the line $x$ $x$ in Fig. 1. Fig. 3 is a transverse section upon the line $y$ $y$ in Fig. 1; and Fig. 4, a transverse section through the axle, showing the plate on the inner face of the hub of the wheel.

Figure 4:
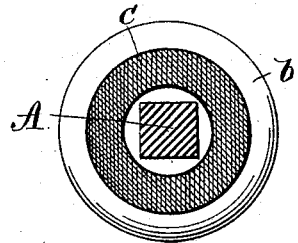

A is the axle of the carriage, and B its wheel fitted to turn freely upon the axle, and to the hub $b$ of which the lock is to be applied, but not directly, so as to avoid weakening of the hub by notching or recessing it, a metal plate, C, being fitted to rest against the inner face of the hub, and preferably secured thereto by screws or otherwise, but not necessarily so, and against the exposed face of which plate the bolt or catch of the lock is made to bear, said exposed face of the plate not being roughened, or, if roughened, only very finely, or as shown in Fig. 4. The movable portions of the lock are contained within a case or frame, D, under cover of a face-plate, $d$. This case or frame is constructed to straddle the axle A, as by cheeks $e$ $e$ on opposite sides of it, and is held stationary on the axle by a set-screw, $f$. By this construction of said frame the lock may be readily applied to the axle or be taken off when required, and be adjusted on or along the axle, and be easily applied to carriages of different construction.

The portion of the lock frame or case D which is immediately under the cover or face-plate $d$ has a longitudinal recess, $g$, within which the movable portions of the lock work, including a sliding bolt or catch, E, a sliding follower, F, in rear of the catch, and a cam-lever, G, for moving the follower and catch forward, said lever being free to work through an opening in the back and side of the case. The bolt or catch E may be of any suitable shape; but I prefer to make it of triangular form, so that it has a pointed or angular front. This catch is not pivoted, but is free to work to either side of the frame, and is held in position, when not at work, by a coiled spring, $i$. When this catch is pressed forward, by manipulating the lever G its angular front is moved forward in a straight course against the hub or plate C, as shown by dotted lines in Fig. 1, and when the carriage-wheel revolves the angular front of the catch would naturally follow the plate C toward a point, $c'$, raising the end $c^2$ of the catch. This tendency or action causes the catch to act as a lock by its endeavor to protrude, which is held in check, however, by the wheel and frame. This triangular construction, too, of the catch E is both simple and substantial, and enables the catch to be easily operated, and locks the wheel, no matter in which way it may be turning. When the catch E is out of engagement with the wheel or plate C on the inner end of the hub thereof, the cam-lever G, which has its fulcrum upon a pin, $s$, in the case D, lies in line with the axle, as shown by full lines in Fig. 1. By turning said lever, however, to a position at right angles, or thereabout, with the axle, as shown by dotted lines in Fig. 1, then it operates to force the catch E forward into contact with the plate C of the hub, and so to lock or hold the wheel from turning. It is preferred to have the catch or bolt E independent, and not to have the lever G act directly upon it, but upon the interposed sliding follower F. By placing a spring, $h$, at the back of the follower for the cam end of the lever to bear against not only is shock avoided and a more gradual action obtained, but the compression of the spring gives the catch E lead, so that it will keep engaged with the plate on the hub of the wheel, and will conform to any wabbling movement of the wheel when throwing the catch into engagement. Said spring will also serve to hold the lever in the position to which it has been adjusted when locking the wheel. This spring $h$, however, might be dispensed with, and a coiled spring, $i$, of proper strength be substituted for it, said spring $i$ being attached at its one end to the fulcrum-pin $s$ and at its other end to a pin, $k$, on the inner face of the catch E, which pin is free to slide in a slot, $l$, in the frame D, thus tying and securing the catch from dropping out of place. Both springs $h$ and $i$, however, may be used, if desired and to advantage.

In a wheel-lock constructed as described the catch or bolt presses against the face of the hub or plate thereon and acts as a wedge or brace, bringing the heaviest strain on the outside nut that holds the wheel on the axle, which is best able to stand the strain. The plate on the inner face or end of the hub insures the operation of the catch and prevents the hub from being dented.

I am aware that there have been various vehicle-wheel locks before in use applied to the axle, among which sliding toothed collars, operated by a rotating shaft and controlled by springs to keep them in engagement with pins on the wheel-hubs, have been used. Others, again, have been in the form of a positive brake, consisting of sliding locking-bolts on the axle made to engage with slotted plates fast on the hubs, said bolts in some cases being controlled by a spring. I therefore disclaim any and all of these or other similar devices, and restrict my invention only to the novel features thereof and combinations of parts as pointed out in the claims.

The angular catch E is here shown as of equilateral-triangular form, but in practice it will be best to make its base twice the length, or thereabout, of its sides, which will give a more or less obtuse angular construction to the end of the catch which engages with the hub.

Having thus fully described my invention, what I claim as new, and desire to secure by Letters Patent, is—

1. The combination of the case or frame D, the locking catch or bolt E, and its follower F, arranged within said case, and the cam-lever G, essentially as described.

2. In a vehicle-wheel lock, the freely-working locking catch or bolt E, of angular construction, in combination with the hub-plate C, substantially as specified.

3. In a vehicle-wheel lock, the combination, with the axle A, of the case or frame D, provided with a longitudinal slot, $g$, the catch or bolt E, having a projection or pin, $k$, adapted to slide in and along said slot, the sliding follower F, the cam-lever G, a spring controlling the catch, the wheel B, and the locking hub-plate C, substantially as specified.

4. The combination of the cam-lever G, the spring $h$, the follower F, and the catch E, essentially as shown and described.

GEORGE N. ADAMS.

Witnesses:
WM. M. ABRAMS, Jr.,
CHAS. WORDELL.